S. A. Barr,
Clothes-Line Fastener.
Nº 67,156. Patented July 30, 1867.
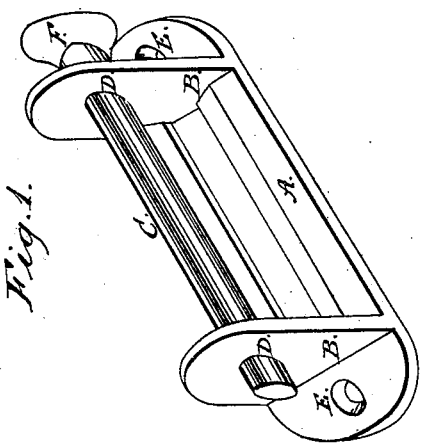
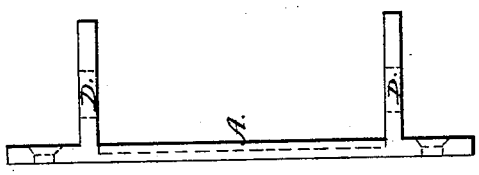
Witnesses;
J. F. Dickey
Fredrik Miller
Inventor;
Samuel A Barr

United States Patent Office.

SAMUEL A. BARR, OF PITTSBURG, PENNSYLVANIA.

Letters Patent No. 67,156, dated July 30, 1867.

---

IMPROVED CLOTHES-LINE FASTENING.

---

The Schedule referred to in these Letters Patent and making part of the same.

---

TO ALL WHOM IT MAY CONCERN:

Be it known that I, SAMUEL A. BARR, of Pittsburg, county of Allegheny, and State of Pennsylvania, have invented a new and improved Clothes-Line Fastening; and I do hereby declare that the following is a full and exact description thereof, reference being had to the accompanying drawings, making a part of this specification, in which—

Figure 1 is a perspective view of my improved fastening for clothes-lines.

Figure 2 is the roller shown as C, fig. 1.

Figure 3 is a side elevation of the bed-piece shown as A, fig. 1.

A, figs. 1 and 3, is the frame or bed-piece, with the lugs B B cast on.

B B, figs. 1 and 3, are the lugs cast on to the bed-piece A, and containing the holes D D, which act as bearings for the roller C.

C, figs. 1 and 2, is the roller, supported by the lugs B B, and around which the clothes-line is passed to secure it.

D D, figs. 1 and 3, are the holes or bearings in the lugs B B, through which the roller C passes.

E E, fig. 1, are screw-holes in the bed-piece A, through which pass the screws which fasten the bed-piece A to the wall or other place of support.

F, figs. 1 and 2, is the flattened end to the roller C, so shaped that the roller may be readily turned around or taken out by hand.

To enable others skilled in the art to make and use my invention, I will proceed to describe its construction and operation.

My invention is constructed of but two pieces: first, the bed-piece A, upon which are cast the lugs B B, which act as bearings or supports for the pin or roller C; and second, the roller C, which passes through the openings D D in the lugs B B, and which is supported from falling through by the head F resting upon the upper lug B. No "fitting" is necessary, and the castings are put together, as shown, just as they come from the foundry. The recess shown in the bed-piece A, between the lugs B and B, is hollowed out so as to prevent the rope when passing around the roller C from rubbing against the frame A.

The operation of this invention is substantially as follows: Several of these fastenings having been secured in a vertical position to different places in the wall or fence of a room or yard the roller C of one of these fastenings is raised up and a loop in the end of the line is slipped over the roller and the roller dropped into place. The operator then carries the line to another fastening, and raising the pin or roller C, passes the line behind it and then returns it to its bearings. This operation is carried on until the line has been secured to all the fastenings. The line may then be crossed in various ways, so that each roller may contain several passes of the line. After as many passes are made as is desired, the operator draws the line "taut," and each roller revolving and acting as a pulley, the line is secured tightly in place, and is held up, without props or other supports, much tighter and straighter than can be done in any other manner. Another great advantage claimed for my improvement exists in the fact that no matter how tightly the lines are drawn up they are never cut or injured in any manner by passing around the rollers, whereas when lines are secured to nails or hooks, as is most generally done at present, they are invariably destroyed after but little wear, and are liable to be cut through at any moment.

What I claim as my invention, and desire to secure by Letters Patent, is—

The within-described clothes-line fastener, as an article of manufacture, consisting of a plate, A, with perforated lugs B B cast upon it, which receive a pin, C, through their perforations, and having also a recess formed between and perforated ears outside of said lugs, as and for the purpose specified.

SAMUEL A. BARR.

Witnesses:
    J. F. DICKEY,
    FREDRICK MILLER.